(12) United States Patent
Dobashi (10) Patent No.: US 7,712,893 B2
(45) Date of Patent: May 11, 2010

(54) JEWELRY ARTICLE FOR A LENS OF EYEGLASSES AND A JEWELRY-INSTALLATION TOOL FOR A PAIR OF EYEGLASSES

(75) Inventor: Hidetaka Dobashi, Kofu (JP)

(73) Assignee: Crossfor Co., Ltd., Yamanashi (JP)

( * ) Notice: Subject to any disclaimer, the term of this patent is extended or adjusted under 35 U.S.C. 154(b) by 0 days.

(21) Appl. No.: 12/266,628

(22) Filed: Nov. 7, 2008

(65) Prior Publication Data
US 2009/0316107 A1    Dec. 24, 2009

(30) Foreign Application Priority Data
Jun. 18, 2008    (JP) .............................. 2008-159200

(51) Int. Cl.
*G02C 11/02*    (2006.01)
(52) U.S. Cl. ............................. 351/52; 351/158; 63/900
(58) Field of Classification Search .................. 351/51, 351/52, 158; 63/1.11, 900
See application file for complete search history.

(56) References Cited

U.S. PATENT DOCUMENTS

| | | | |
|---|---|---|---|
| 4,988,181 A * | 1/1991 | Riach, Jr. ..................... | 351/52 |
| 5,912,718 A | 6/1999 | Murai et al. | |
| 6,863,394 B1 | 3/2005 | Nelson et al. | |
| 7,322,214 B2 * | 1/2008 | Ignatowski .................... | 63/38 |
| 2003/0110798 A1 | 6/2003 | Ignatowski | |
| 2009/0282868 A1 * | 11/2009 | Dobashi ..................... | 63/29.2 |

FOREIGN PATENT DOCUMENTS

| | | |
|---|---|---|
| DE | 19629327 A1 | 1/1998 |
| DE | 19835585 A1 | 2/2000 |
| JP | 2000318395 | 11/2000 |
| JP | 2000318395 A | 11/2000 |

* cited by examiner

*Primary Examiner*—Huy K Mai
(74) *Attorney, Agent, or Firm*—Cermak Kenealy Vaidya & Nakajima LLP (57) ABSTRACT

The base, on which the main body of a jewel is mounted, and the rear surface magnet are connected to the chain part. By this jewelry article for eyeglasses being mounted on a lens of the pair of eyeglasses, even if the main body of a jewel and the rear surface magnet fall because of their positioning difference on the lens occurred by some contacts to the main body of the jewel, the base and the rear surface magnet are in a state of being hanged down on an eyeglass frame through the chain part joined to the eyeglass frame by the joining part for an eyeglass frame.

11 Claims, 13 Drawing Sheets

JEWELRY ARTICLE FOR A LENS OF EYEGLASSES AND A JEWELRY-INSTALLATION TOOL FOR A PAIR OF EYEGLASSES

FIELD OF INVENTION

The present invention relates to a jewelry article to be mounted on a lens of eyeglasses.

BACKGROUND OF THE INVENTION

In recent years eyeglasses are requested for not only a function but also high ornamental character. Accordingly, for instance; there is a technology to fix a main body of a jewel at any place on a lens by a magnet, as stated in the Japanese published patent application 2000-318395, besides various decorations are given on an eyeglass frame.

This technology is that the first magnet is put on a desired position of a rear surface of a lens by a double-face adhesive tape, and the second magnet, on which an ornamental article is fixed, is held by a magnetic force on a relative position to the first magnet on the front surface of the lens detachable and rotatable.

SUMMARY OF THE INVENTION

However, the conventional jewelry for eyeglasses mentioned above has a disadvantage, that the position of the first and the second magnets above mentioned shift when the main body of a jewel hits any object. Then, the main body of a jewel falls from a lens, and there is a possibility of losing of the main body of a jewel.

In view of the disadvantage above mentioned, the objective of this invention is to provide a jewelry article for a lens of eyeglasses and an installation tool for eyeglasses, which can prevent the main body of a jewel held by a magnet on a lens from losing by the fall.

Means to Solve the Disadvantages

To solve the conventional disadvantages mentioned above and achieve the objective mentioned above, a jewelry article for eyeglasses of this invention of the first perspective is a jewelry article to be mounted on a lens of eyeglasses. It comprises a base held on a front surface of a lens, a main body of a jewel fixed on the base, a part held by a magnetic force generated between the base and the part at a position relative to the base on the front surface of the lens, and a linear article joined to an eyeglass frame detachably and set with the base and the part.

When using a jewelry article for eyeglasses of this invention of the first perspective, an end part of the linear article is mounted on an eyeglass frame. Besides, a base is set on a desired position on a front surface of a lens of eyeglasses, and a part is held on a relative position attracting to the base on the front surface of the lens. Then, the base and the part are mutually attracting by a magnetic force generated between the base and the part. As a result, the base and the part are held on the lens by friction generated from the magnetic force.

Hereupon, an end part of the linear article is joined to the base, and another end part of the linear article is joined to an eyeglass frame detachable. Therefore, even if the main body of a jewel falls from a lens of eyeglasses by hitting any objects, the main body of the jewel with the base and the part are in a state of being hanged down on an eyeglass frame by the linear article. As a result, the main body of the jewel and the part are not lost.

A jewelry article for eyeglasses of the first perspective of this invention preferably has the base held at an end part of the linear article, a joining-part for an eyeglass frame detachably jointed to the eyeglass frame at another end of the linear article, and the part held between the base and the joining-part for an eyeglass frame on the linear article.

The base of the jewelry article for eyeglasses of the first perspective of this invention is preferably a doughnut shape and a part of a main body of a jewel is implanted in its midair part.

The jewelry article for eyeglasses of the first perspective of this invention is preferably set permanent magnets up on each of the base and the part, which are attracting mutually by a magnetic force.

A main body of a jewel is preferably implanted in the part of the jewelry article for eyeglasses of the first perspective of this invention.

The linear article of the jewelry article for eyeglasses of the first perspective of this invention is preferably a chain, and the joining-part for an eyeglass frame comprises a ball-part for an eyeglass frame that has a perforation hole to pass the chain through is installed along the chain removable, and an end part of the chain is held at a holdback set on the ball-part for an eyeglass frame.

A main body of a jewel is preferably installed on the joining-part for an eyeglass frame of the jewelry article for eyeglasses of the first perspective of this invention.

The length of the linear article of the jewelry article for eyeglasses of the first perspective of this invention is preferably 5-30 cm.

A magnet to form a fixed distance relation at least for one side of the base and the part while installed on the eyeglasses at fixed positions other than both ends of the chain has been preferably set.

A jewelry-installation tool for eyeglasses of the second perspective of the invention is to be used to mount a main body of a jewel on a lens of eyeglasses. It comprises the base to be positioned on a front surface of the lens and to fix the main body of a jewel, the part to be held by a magnetic force generated between the part and the base on a relative position to the position of the base on the front surface of the lens, and the linear article joined to an eyeglass frame detachably and set with the base and the part.

EFFECT OF THIS INVENTION

This present invention can provide a jewelry article for a lens of eyeglasses and an installation tool for a pair of eyeglasses to prevent the main body of a jewel held by a magnet on a lens from losing by the fall.

DETAILED DESCRIPTION OF THE INVENTION

The Preferred Embodiment of this Invention

The jewelry article related to the embodiment of this invention will be better understood from referring the following drawings.

The First Embodiment of this Invention

Figure 1:
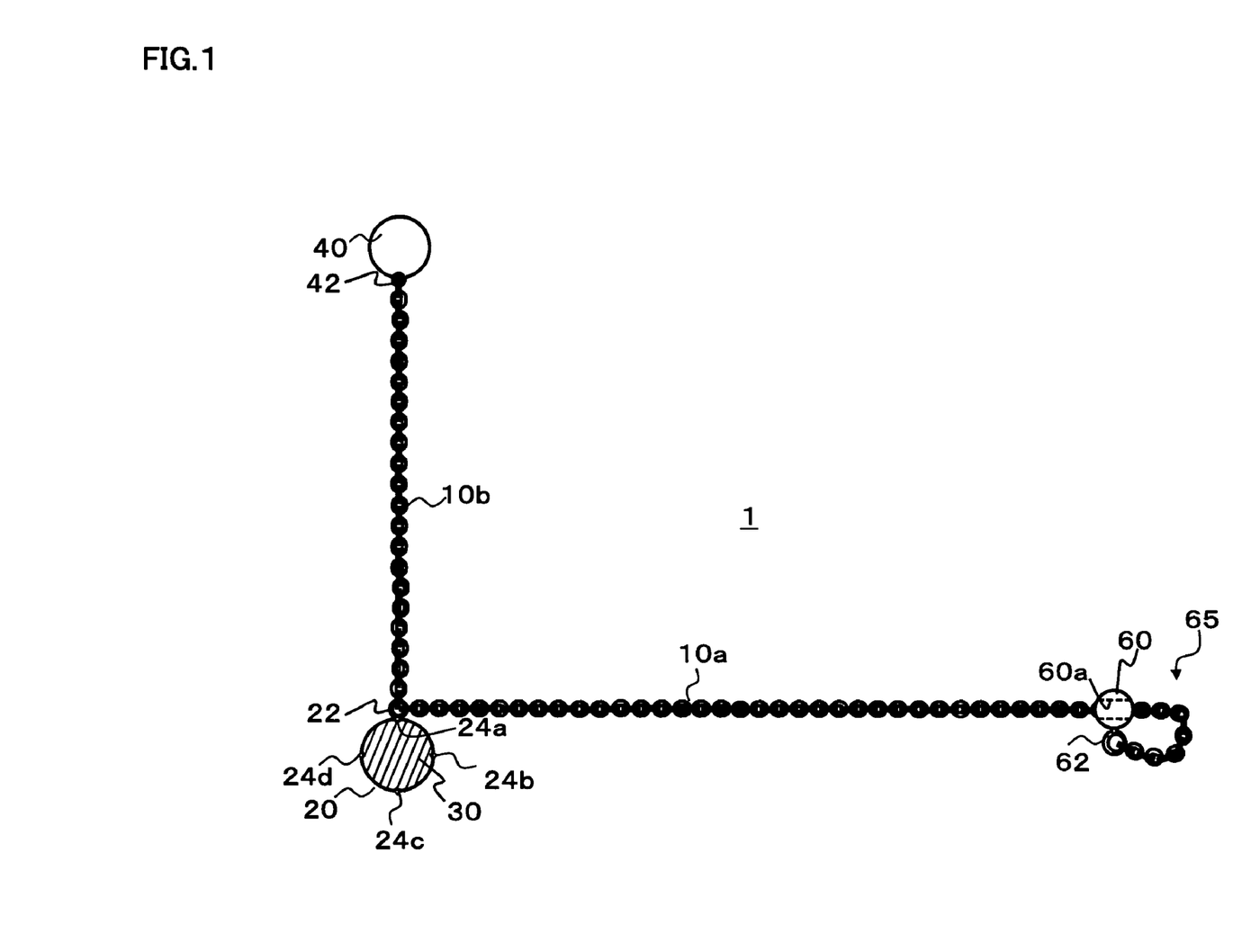
FIG. 1 is an external figure of the front side of the jewelry article 1 relates to an embodiment of this invention.
Figure 2A:
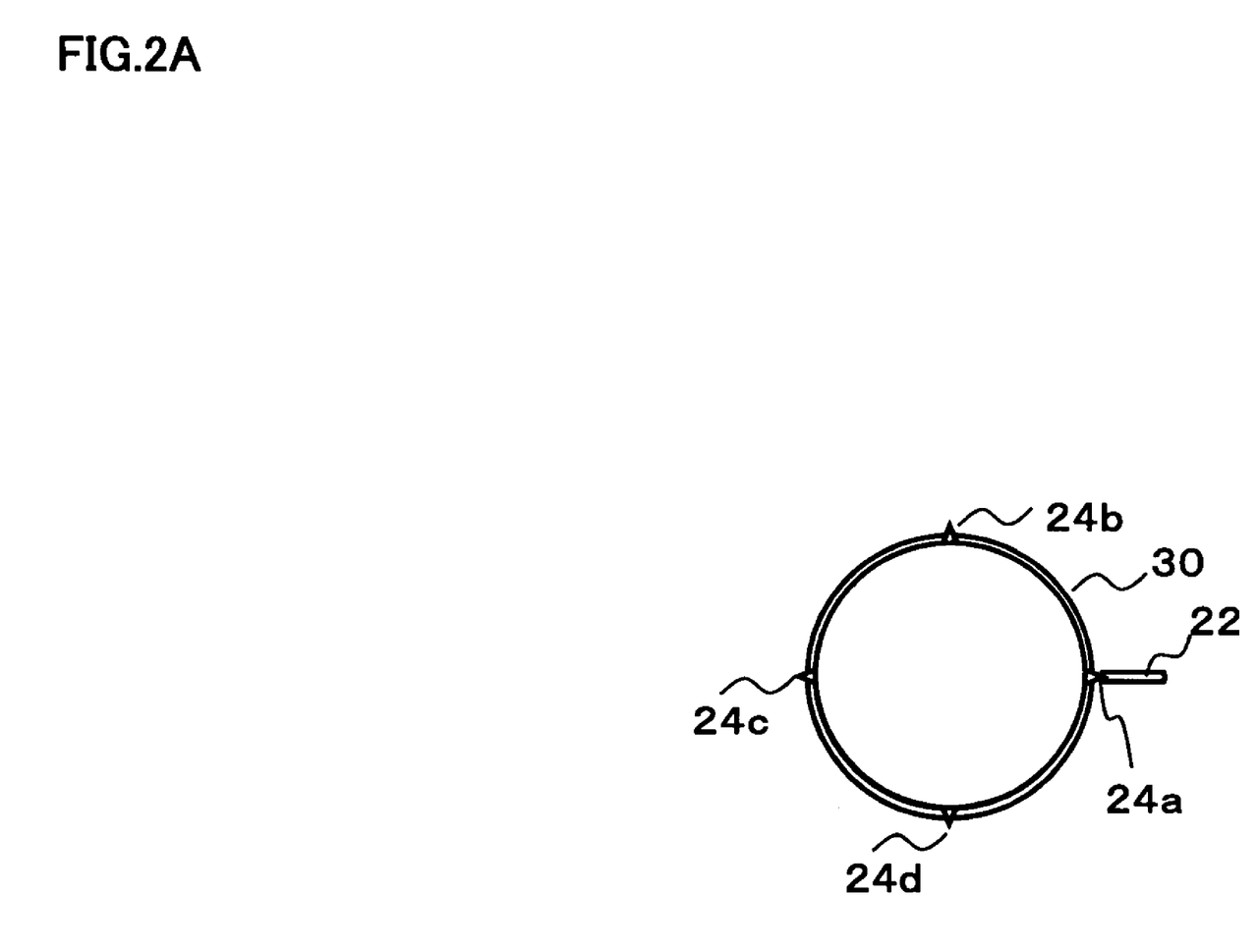
FIG. 2A illustrates a bottom surface figure that a jewel is fixed on the base of the jewelry article 1 of eyeglasses shown in FIG. 1.
Figure 2B:
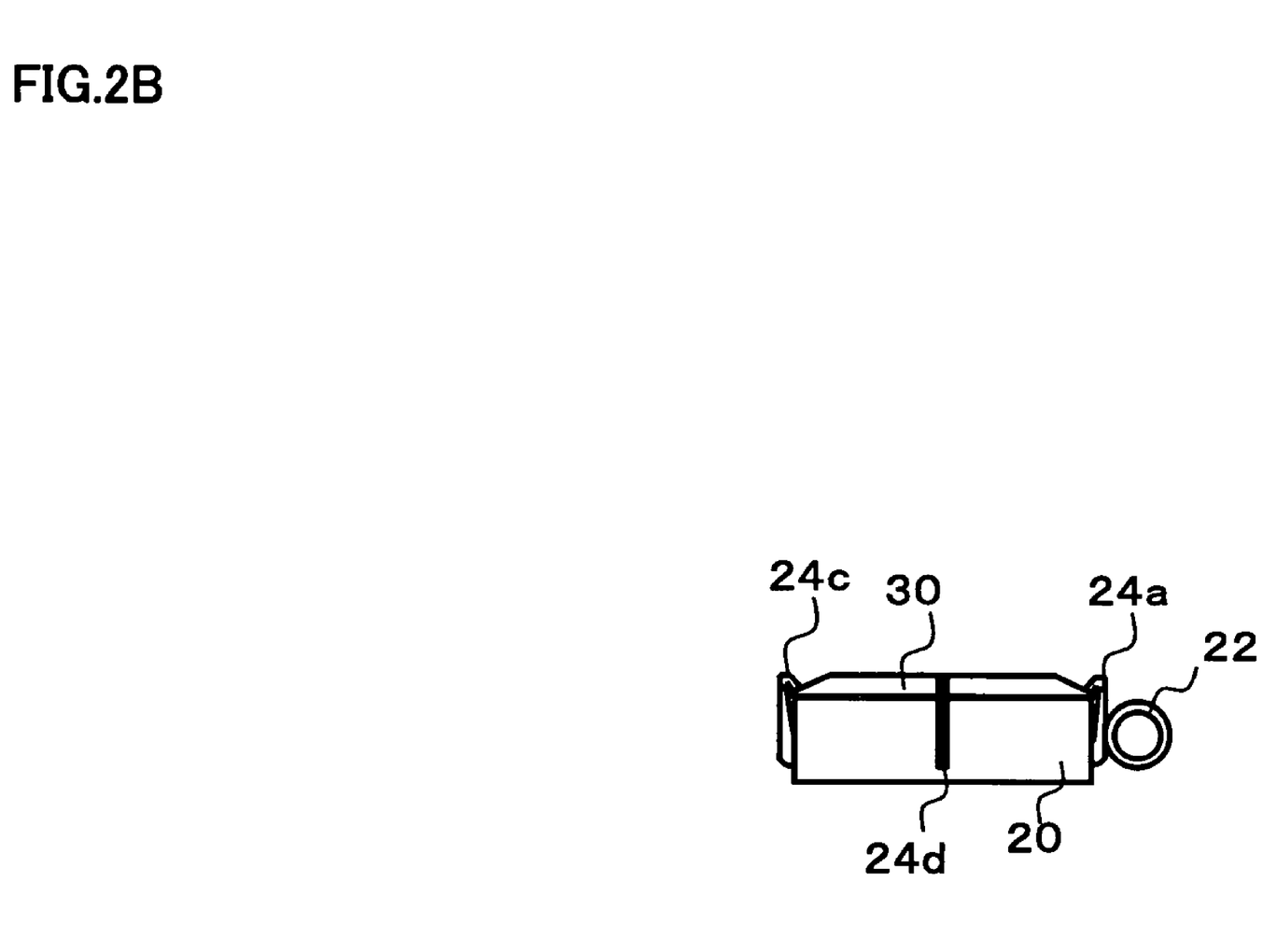
FIG. 2B is a side lateral view of the base of the jewelry article shown in FIG. 1.
Figure 2C:
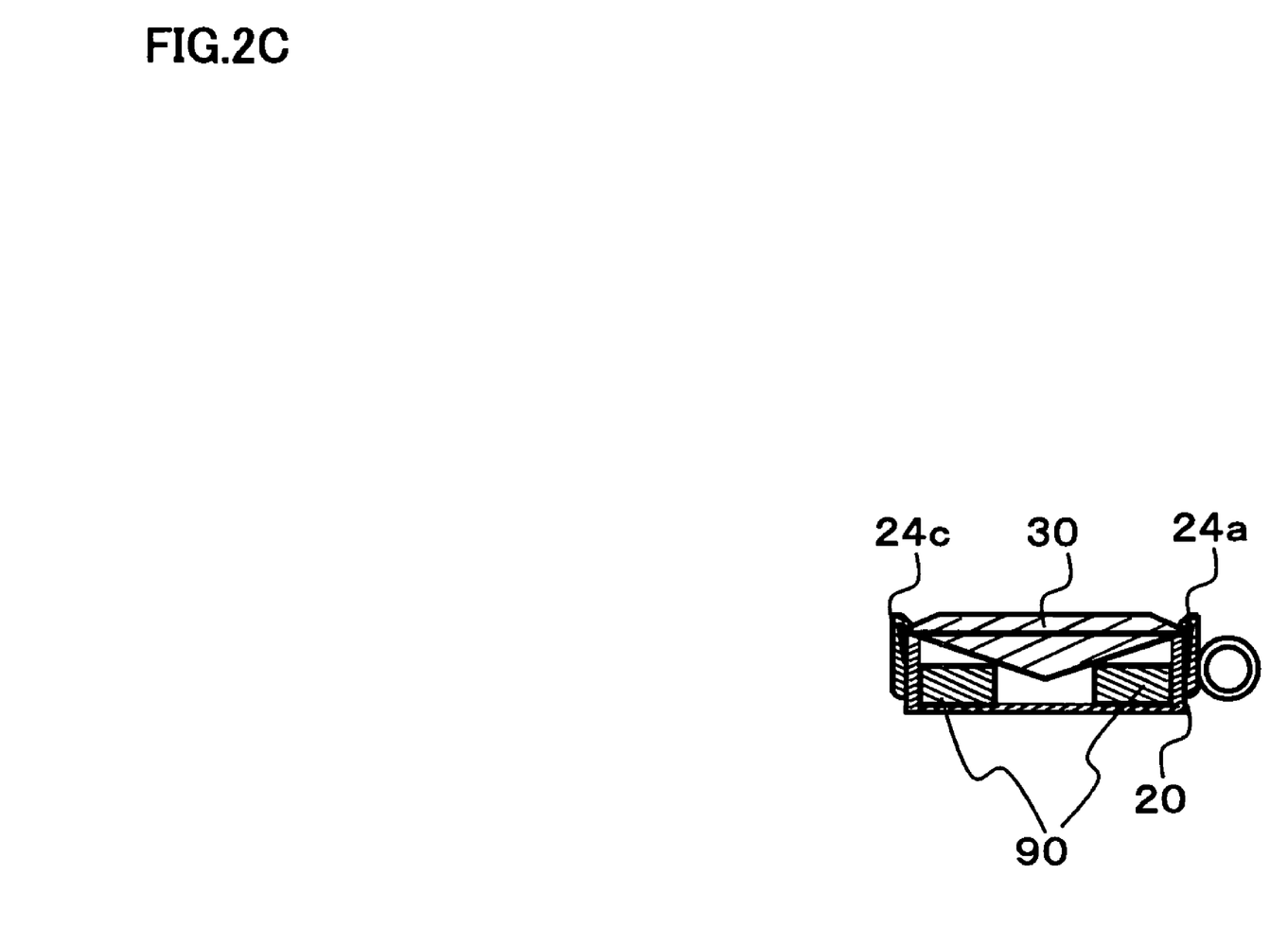
FIG. 2C is a cross sectional view of the base of the jewelry article shown in FIG. 1.
Figure 3:
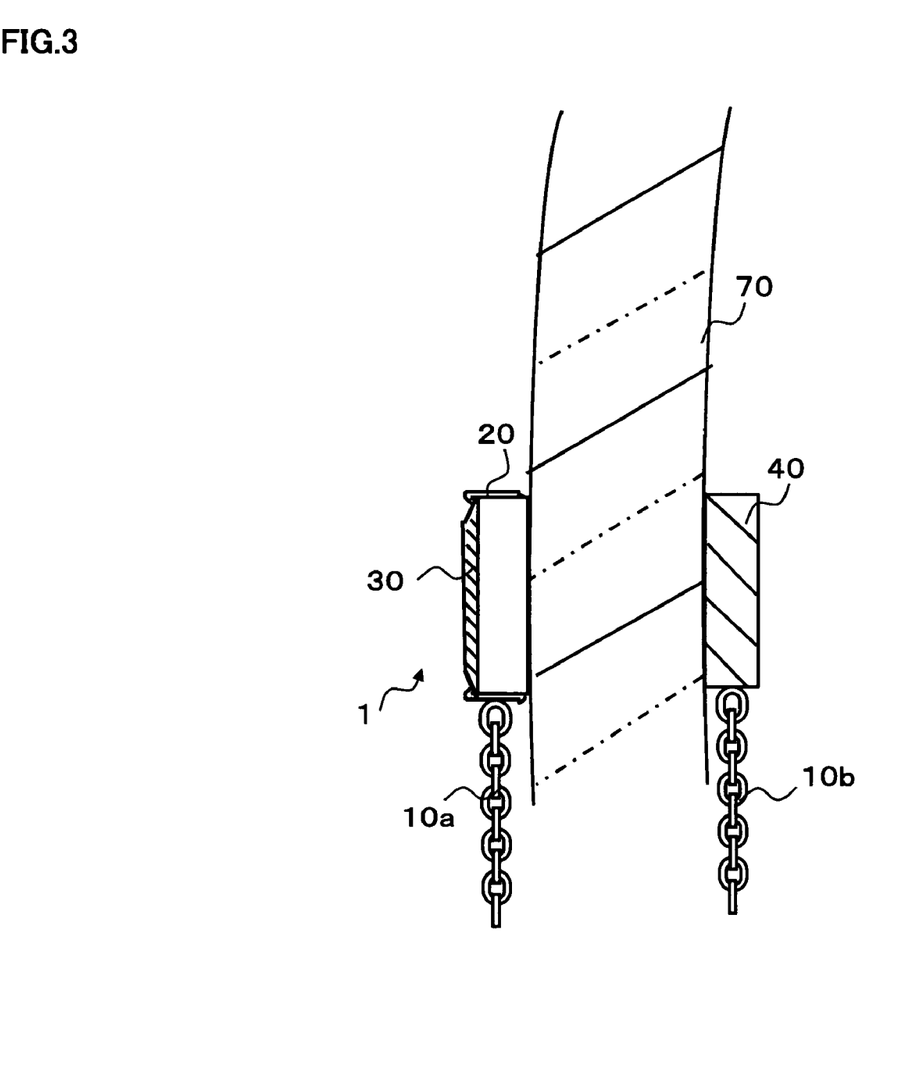
FIG. 3 is a figure to explain a cross sectional structure in a state of that the jewelry article of eyeglasses shown in FIG. 1 is set on a lens of eyeglasses.

FIG. 1 illustrates an external figure of the front side of the jewelry article 1 relates to an embodiment of this invention. FIG. 2A illustrates an external figure of a back view of the base 20, and FIG. 2B is a side lateral view of the base 20, on which a main body of a jewel 30 of the jewelry article 1 illustrated in FIG. 1 is fixed. FIG. 2C illustrates a cross sectional structure of the base 20. FIG. 3 illustrates a cross sectional structure in a state of that the jewelry article 1 illustrated in the FIG. 1 is mounted on a lens 70 of the pair of eyeglasses 3.

As illustrated in FIG. 1, the jewelry article 1 for eyeglasses comprises for example; a chain part 10a and 10b, a base 20, a main body of a jewel 30, a rear surface magnet 40 of a lens of the pair of eyeglasses, and a ball-part for an eyeglass frame.

Hereupon the chain part 10 and the base 20 are compounded of, for example; gold (Au), silver (Ag), platinum (Pt) or other metals etc.

Hereupon, the base 20 is an example for a base of this invention, the main body
of a jewel 30 is an example for a main body of a jewel of this invention, the
rear surface magnet 40 is an example for a part of this invention and the chain
part 10a and 10b is an example for a linear article of this invention.

The jewelry article 1 for eyeglasses has the base 20 set in a permanent magnet on a front surface of the lens of eyeglasses and the rear surface magnet 40 on a rear surface of the lens confronting with the base 20. Therefore, the lens is tucked by the magnetic force generated between the base 20 and the rear surface magnet 40, and the main body of a jewel 30 can be put on a desired position on a front surface of the lens.

By the jewelry article 1 for eyeglasses, an end part of the chain part 10b is connected to a holdback 42 of the rear surface magnet 40, and another end part of the chain part 10b is connected to a holdback 22 of the base 20.

Then, an end part of the chain part 10a is jointed to the holdback 22 of the base 20, and a joining-part for an eyeglass frame 65 is set to another end part of the chain part 10a.

Therefore, even if the base 20 and the rear surface magnet 40 fall because of their positioning difference on the lens occurred by some impacts to the main body of the jewel 30, the base 20 and the rear surface magnet 40 are in a state of being hanged down on an eyeglass frame through 10a and 10b of the chain part 10 joined to an eyeglass frame by the joining part for an eyeglass frame 65. This can prevent the main body of a jewel 30, the base and the rear surface magnet 40 from losing.

Each component of the jewelry article 1 for eyeglasses is explained in detail as followings.

As illustrated in FIG. 1, by the jewelry article for eyeglasses, an end part of the chain part 10b is jointed to the holdback 42 of the rear surface magnet 40, and another end part of the chain part 10b is jointed to the holdback 22 of the base 20.

Then, the end part of the chain part 10a is connected to the holdback 22 of the base 20, and the joining part for an eyeglass frame is set to another end part of the chain part 10a.

The chain part 10a and 10b is compounded, for example; metal or synthetic resin.

The length of the chain part 10a is, for example, approximately 3-20 cm, preferably approximately 7 cm.

The length of the chain part 10b is, for example, approximately 2-10 cm, preferably approximately 4 cm.

The length of the chain part 10a and 10b are determined according as the positioning of the jewel 30 on a lens of eyeglasses and a demand on the length of the chain part 10a and 10b.

A joining part of an eyeglass frame 65 is formed from a loop of the chain part 10b by a ball-part for an eyeglass frame 60.

A ball-part for an eyeglass frame 60 has a penetration hole 60a, which passes a central point of the ball, and the chain part 10b passes through the hole 60a in a state of being removable.

The ball-part for an eyeglass frame 60 is used to adjust the size of the loop of the joining part of an eyeglass frame 65 formed partially of the chain part 10a located between the holdback 62 and the hole 60a. This joining part of an eyeglass frame 65 is mounted on an eyeglass frame.

When the ball-part 60 for an eyeglass frame is moved by fingers etc. to the base 20 along the chain part 10a closer, the loop mentioned above becomes bigger, and when the ball-part 60 for an eyeglass frame is moved to the holdback 62 closer, the loop mentioned above becomes smaller.

An user puts an eyeglass frame through the loop, while the user makes the loop big moving the ball-part 60 for an eyeglass frame along the chain part 10a. Then, the user makes the loop small on a fixed position of a lens of the eyeglass frame 3, as illustrated FIG. 4.

Figure 4:
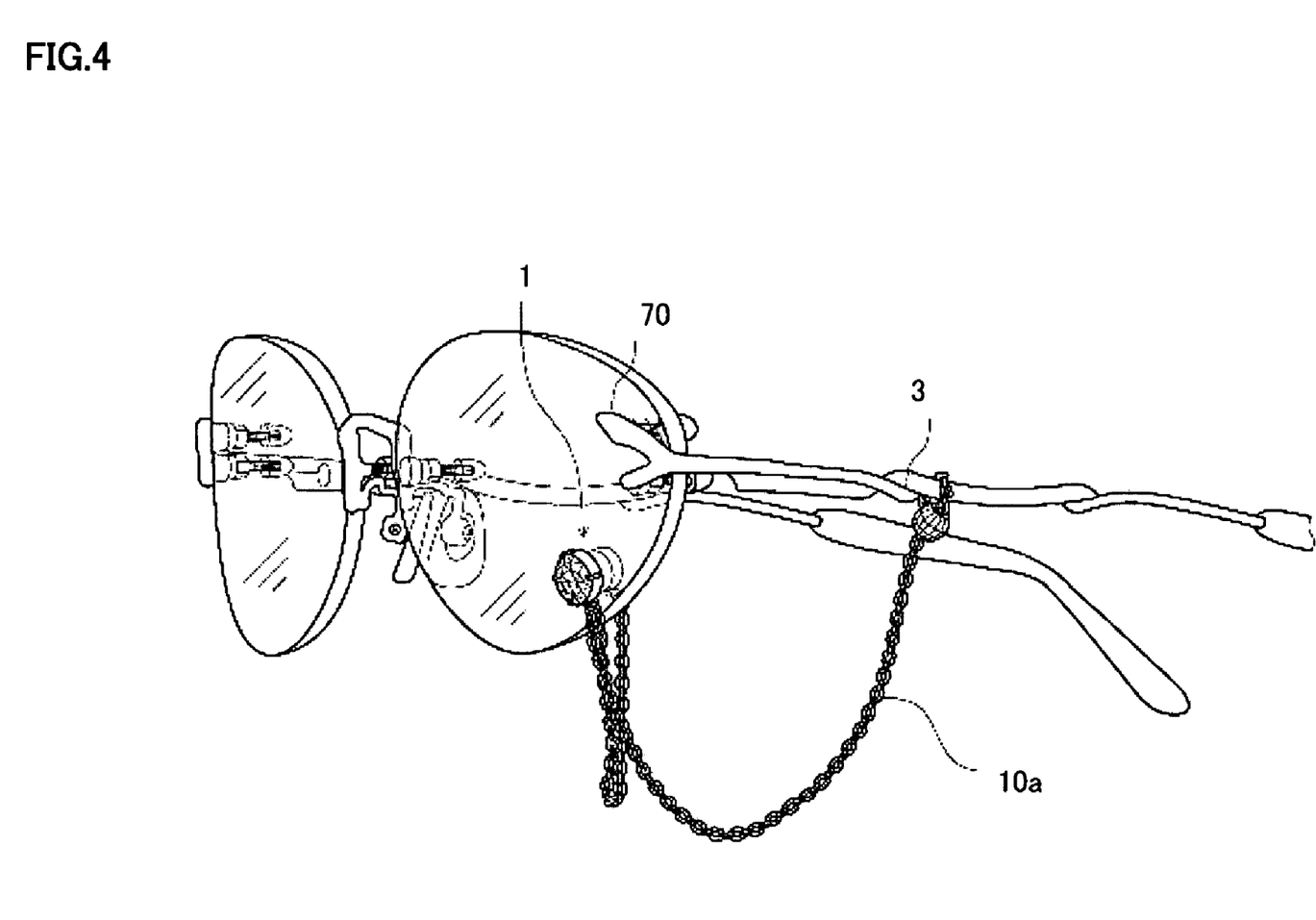
FIG. 4 is to explain a state of that the jewelry article of eyeglasses shown in FIG. 1 is mounted on eyeglasses.

This can prevent the joining part of an eyeglass frame 65 from unfastening from the eyeglass frame 3 readily.

The rear surface magnet 40 is a permanent magnet and for example, a disk shape having the outside diameter as approximately same as the base 20's.

The holdback 42 is set on the outer circumference of the rear surface magnet 40.

The holdback 42 is joined to the end part of the chain part 10b.

The base 20 is for example, approximately a doughnut shape, and the holdback 22 is fixed on a set position of its outer circumference.

An end part of the chain part 10b and 10a are connected to the holdback 22.

As illustrated FIGS. 2A, 2B and 2C, 4 prong settings 24a, 24b, 24c, and 24d are installed at a regular space along the outer circumference of the base 20 to hold the main body of a jewel 30, which is a diamond.

The holdback 22 is set on the outer circumference of the prong setting 24a.

The thickness of the base 20 is, for example, 1.5 mm.

Moreover, a ring shaped permanent magnet 90 is held in the bottom side of the base 20. A diamond is cut usually approximately conic; therefore, its apex side should be mounted in the midair part of the ring of the permanent magnet 90 in the base 20 as shown in the FIGS. 2A, 2B, and 2C. As a result, the entire thickness of the base 20 and the main body of a jewel 30 can be thin, and its design can be superior.

It is still illustrated that a diamond as the main body of a jewel 30 is hold by 4 prong settings 24a, 24b, 24c, and 24d in this embodiment, more or less than 4 prong settings may be formed. Alternatively, the main body of a jewel 30 may be another material besides a diamond.

The structure to hold the main body of a jewel 30 on the base 20 is properly selected according to every variety of the main body of a jewel 30.

Alternatively, the base 20 itself may be formed by a permanent magnet.

It is explained a manner how to place a jewelry article 1 for eyeglasses to an eyeglass frame 3 as followings.

As mentioned above, a user puts an eyeglass frame 3 through the mentioned above loop of the joining part for an eyeglass frame 65, while the user makes the loop big moving the ball-part 60 for an eyeglass frame to the base 20 along the chain part 10. Then, the user makes the loop small on a fixed position near a lens of the eyeglass frame 3, as illustrated FIG. 4. As a result, an end part of the chain part 10 is set on an eyeglass frame 3.

As shown in the FIG. 3 and FIG. 4, the user places the base 20 on a desired position on a front surface of the lens 70 of eyeglasses next so that the main body of a jewel 30 is located on the front side. While keeping the state above mentioned, the user positions a side of the rear surface magnet 40 relatively to the base 20 on the front surface of the lens 70 of eyeglasses, whereby a magnetic force functions in a direction of attracting each other between the rear surface magnet 40 and the base 20.

Concretely, when a side of the base 20 met a front surface of a lens is the south pole of a magnet, a side of the north pole of the rear surface magnet 40 is met a rear surface of the lens. On the other hand, when a side of the base 20 met a front surface of a lens is the north pole of a magnet, a side of the south pole of the rear surface magnet 40 is met a rear surface of the lens.

As a result, the base 20 and the rear surface magnet 40 are attracting each other by a magnetic force through the lens 70 of eyeglasses, and sufficient friction to keep the position of the base 20 and the rear surface magnet 40 against gravity respectively is generated between the base 20 and the front surface of a lens, and the rear surface magnet 40 and the rear surface of the lens.

Figure 5:
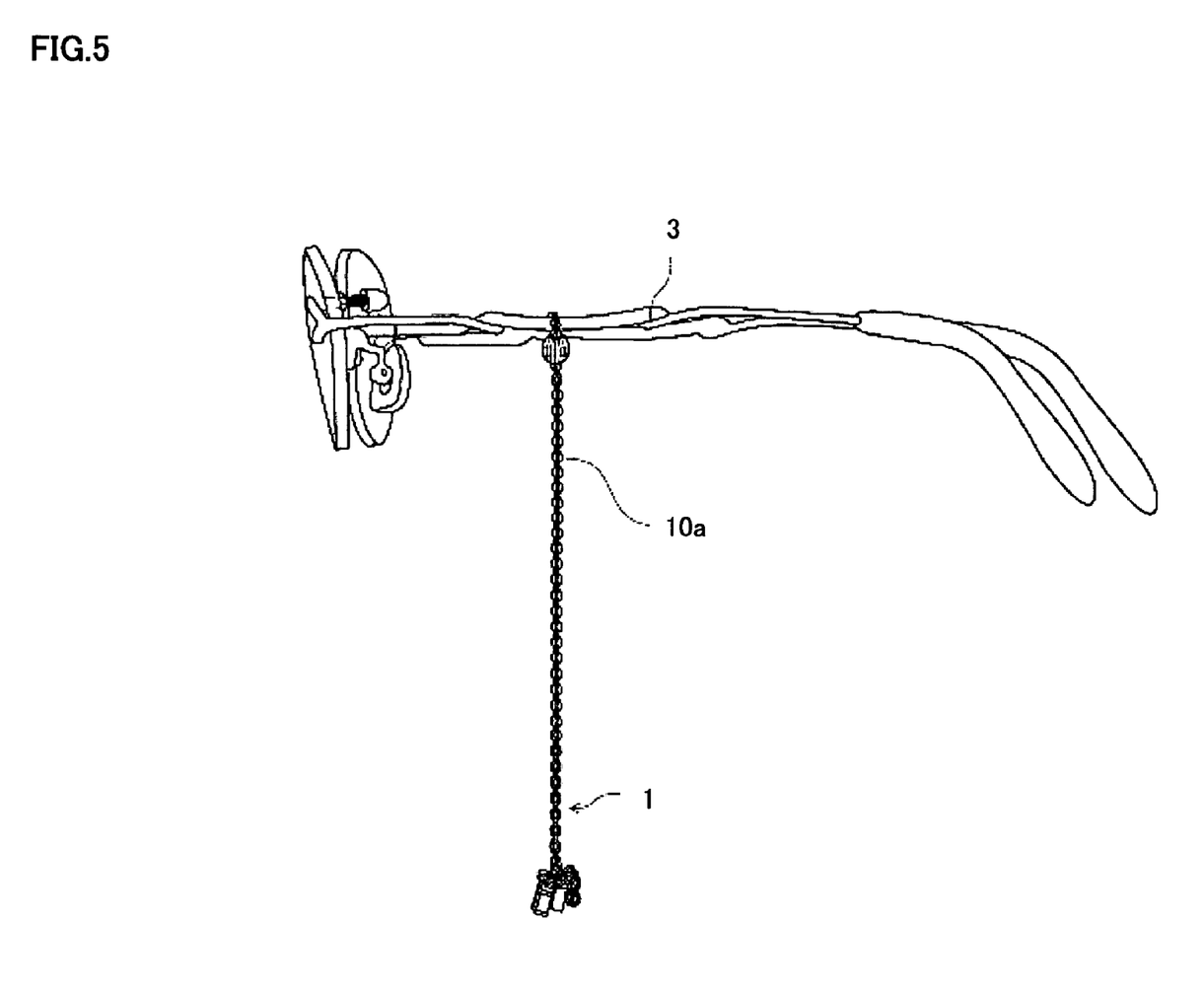
FIG. 5 illustrates a state of that the jewelry article 30 falls off from the state illustrated in FIG. 4.

By the jewelry article 1 for eyeglasses being mounted on a lens 70 of the pair of eyeglasses, even if the main body of a jewel 30 and the rear surface magnet 40 fall because of positioning difference of the base 20 and the rear surface magnet 40 on the lens 70 occurred by some contacts to the main body of the jewel 30, the base 20 and the rear surface magnet 40 are in a state of being hanged down on an eyeglass frame through the chain part 10 joined to the eyeglass frame by the joining part for an eyeglass frame 65, as illustrated in FIG. 5. Therefore, it can be prevented to lose the main body of a jewel 30, the base 20 and the rear surface magnet 40.

Moreover, the jewelry article 1 comprises design character as shown in FIG. 1 etc. Therefore, it can provide a superior design unifying the jewel 30.

The Second Embodiment of this Invention

It was illustrated in the first embodiment mentioned above that the base 20 exists among the rear surface magnet 40 and the ball-part 60 for an eyeglass frame, when the ring of an end part of the chain part 10a and 10b are connected to the holdback 22 of the base 20.

Figure 6:
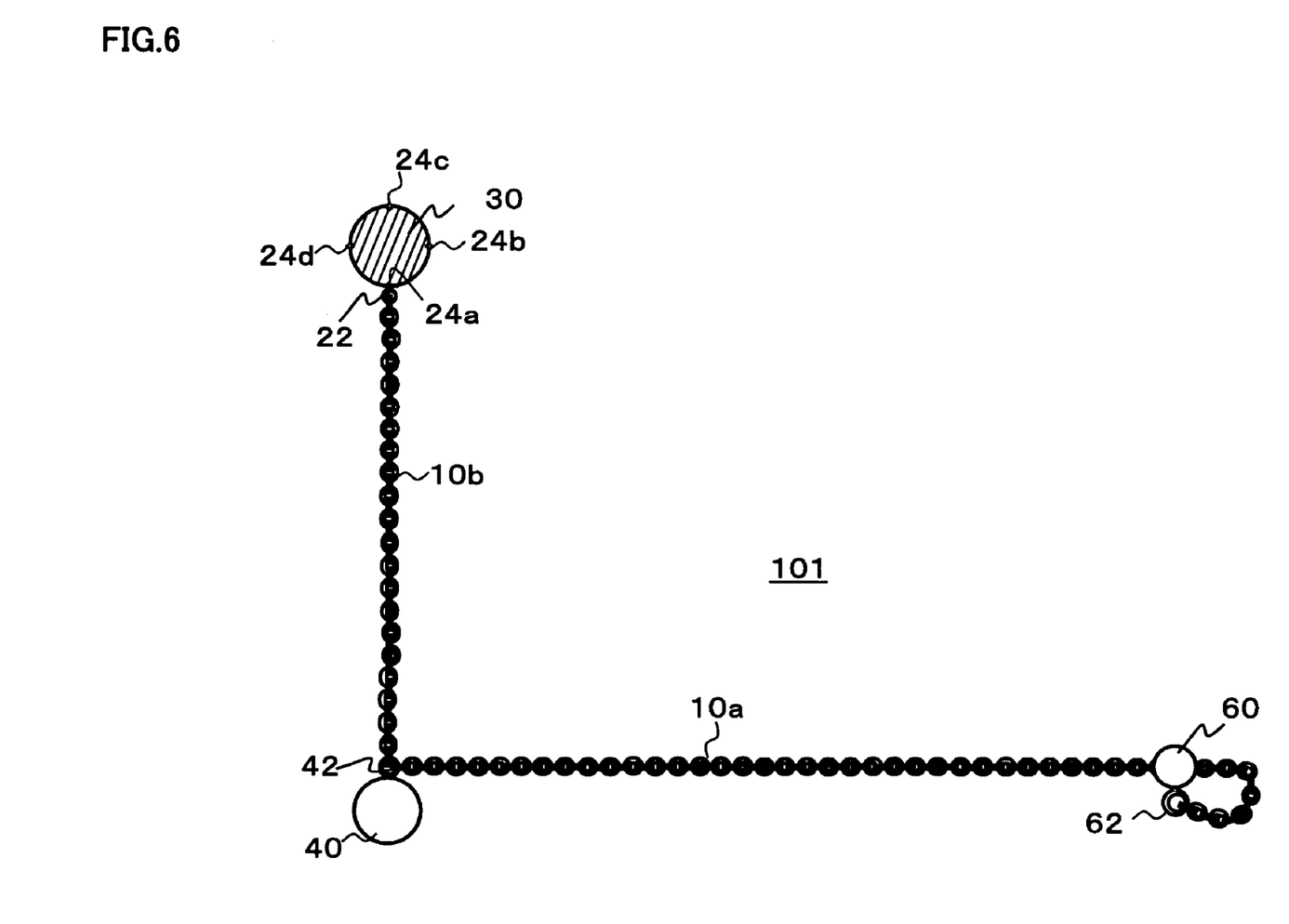
FIG. 6 illustrates an external figure of a front side of the jewelry article of the second embodiment of the invention.

FIG. 6 illustrates an external figure of the front side of the jewelry article 101 relates to the second embodiment of this invention.

As illustrated in FIG. 6, a ring of end part of the chain part 10a and 10b are connected to the holdback 42 of the rear surface magnet 40 by this jewelry article 101 for eyeglasses. Namely, the rear surface magnet 40 exists among the base 20 and the joining part 65 for an eyeglass frame.

By the jewelry article 101, as same as the jewelry article 1 for eyeglasses of the first embodiment, the main body of a jewel 30 can be held by a magnetic force generated between the base 20 and the rear surface magnet 40

The Third Embodiment of this Invention

Figure 7:
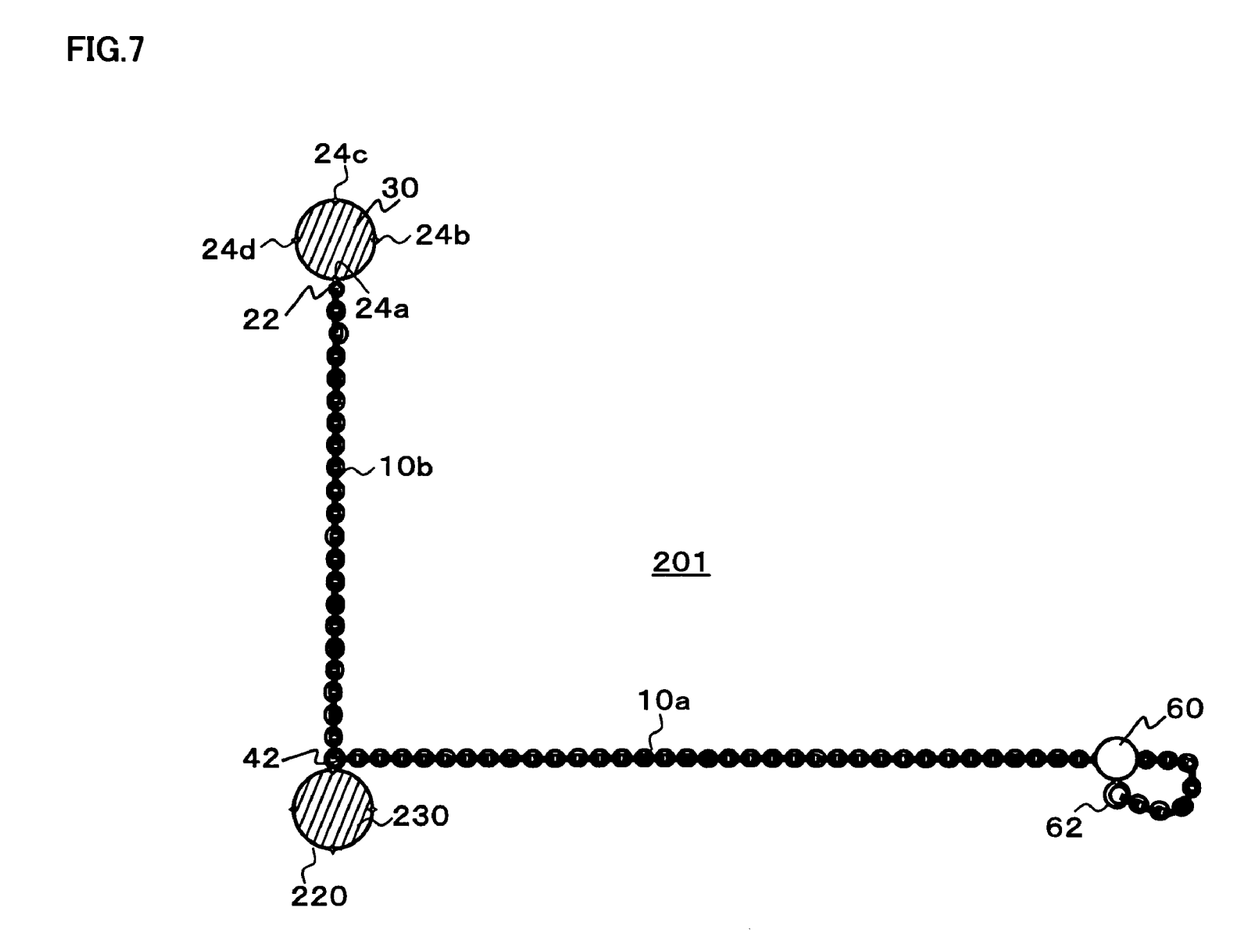
FIG. 7 illustrates an external figure of a front side of the jewelry article of the third embodiment of the invention.

FIG. 7 illustrates an external figure of the front side of the jewelry article 201 relates to the third embodiment of this invention.

As illustrated in FIG. 7, an end part of the chain part 10b is connected to the base 20, and another end part of the chain part 10b is jointed to the base 220 by this jewelry article 201 for eyeglasses. The main body of a jewel 230 is mounted on a surface of the base 220.

Hereupon, a permanent magnet is set on the base 220. Then, a rear surface of the base 20 and 220 are placed on their confronting position on a lens. As a result, the base 20 and 220 are held by a magnetic force generated between them on a fixed position of a lens.

The jewelry article 201 can achieve the same effect as the first embodiment.

Moreover, the jewelry article 201 can demonstrate higher ornamental character using the base 220, on which the main body of a jewel 230 is mounted, instead of the rear surface magnet 40 of the first embodiment.

The Fourth Embodiment of this Invention

Figure 8:
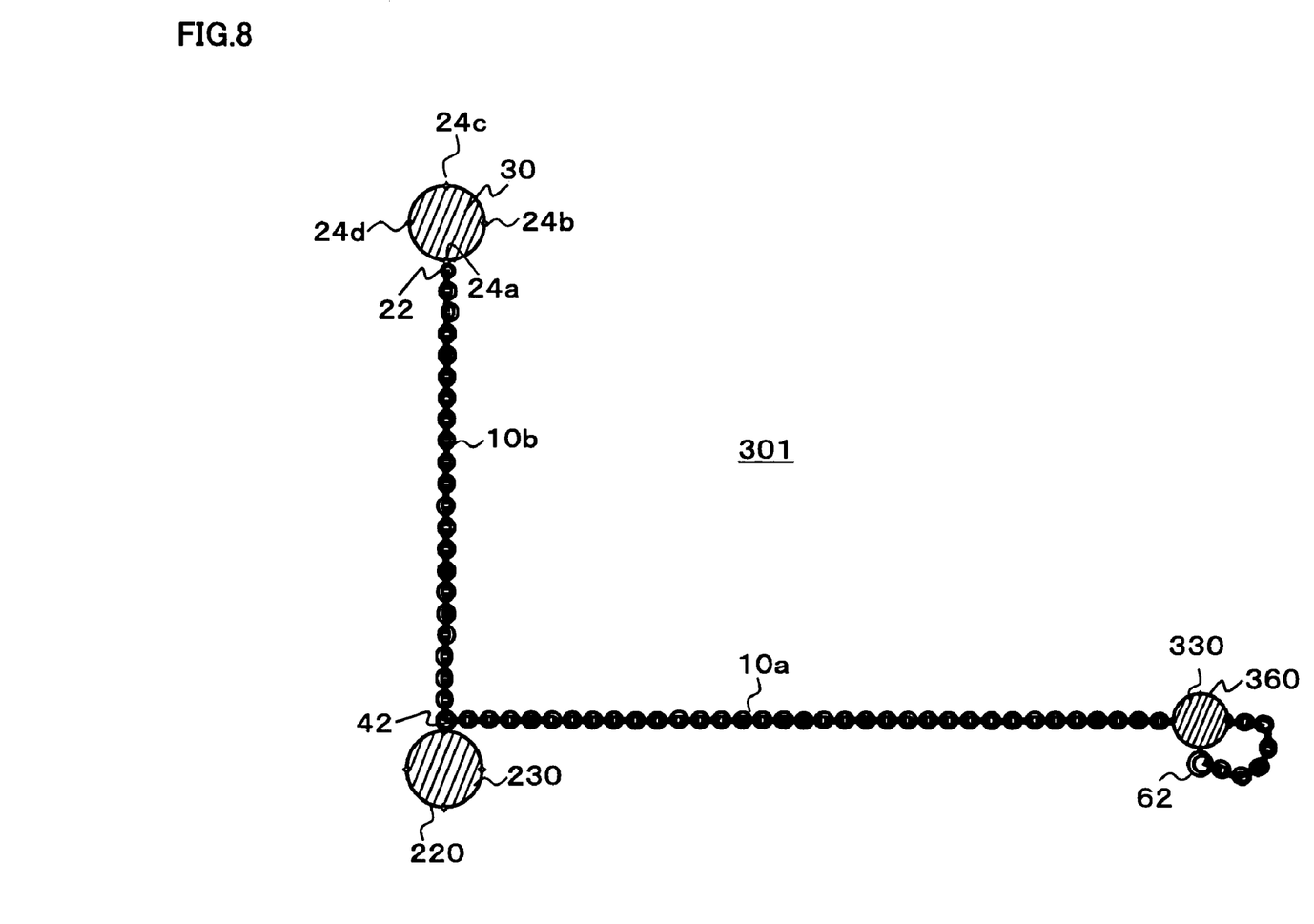
FIG. 8 illustrates an external figure of a front side of the jewelry article of the forth embodiment of the invention.

FIG. 8 illustrates an external figure of the front side of the jewelry article 301 relates to the forth embodiment of this invention.

As illustrated in FIG. 8, an end part of the chain part 10b is connected to the base 20, and another end part of the chain part 10b is jointed to the base 220 by this jewelry article 301 for eyeglasses. The main body of a jewel 230 is mounted on a surface of the base 220.

The jewelry article 301 for eyeglasses has still the joining part 360 for an eyeglass frame, on which the main body of a jewel 330 is mounted. The joining part 360 for an eyeglass frame is, for example, a disk shape and has a perforation hole to pass the chain part 10b through.

The jewelry article 301 can achieve the same effect as the first embodiment.

Moreover, the jewelry article 301 can demonstrate higher ornamental character using the joining part 360 for an eyeglass frame, on which the main body of a jewel 330 is mounted.

The Fifth Embodiment of this Invention

Figure 9:
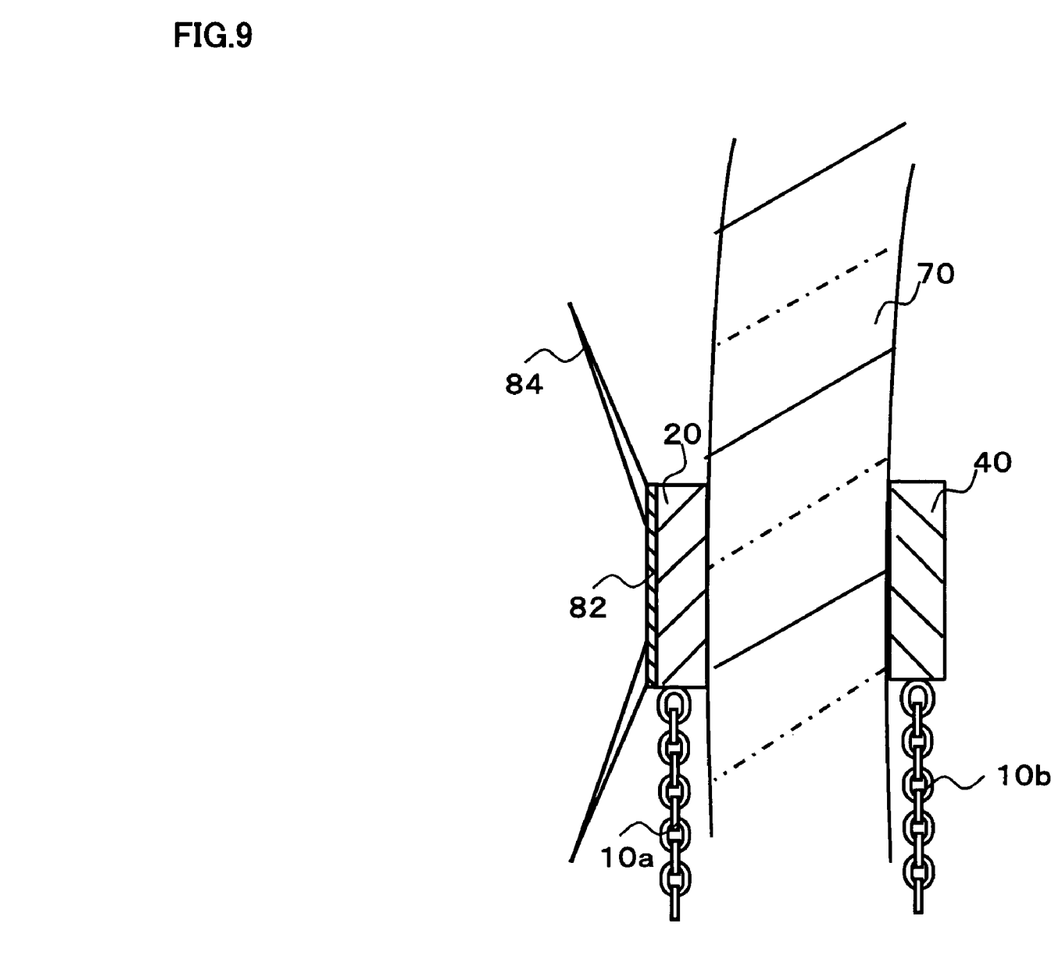
FIG. 9 illustrates an external figure of a front side of the jewelry article of the fifth embodiment of the invention.

FIG. 9 illustrates a cross sectional figure in a state of that the base 20, the rear surface magnet 40 are held on the lens 70 of eyeglasses by using the jewelry article of the fifth embodiment of the invention.

As illustrated in FIG. 9, an ornamental article 84 is held on the base 20 through an adhesive sheet or an adhesive agent 82 on this embodiment.

The jewelry article of this embodiment can demonstrate higher ornamental character.

This invention is not limited in the embodiment mentioned above. Namely, regarding the component in the embodiment mentioned above, a person skilled in the art can do various changes, combination, sub-combination, and substitution in the technical or equivalent of this invention.

For example, the position and the number in which the main body of jewelry on the chain part 10a and 10b is arranged are arbitrary.

Figure 10:
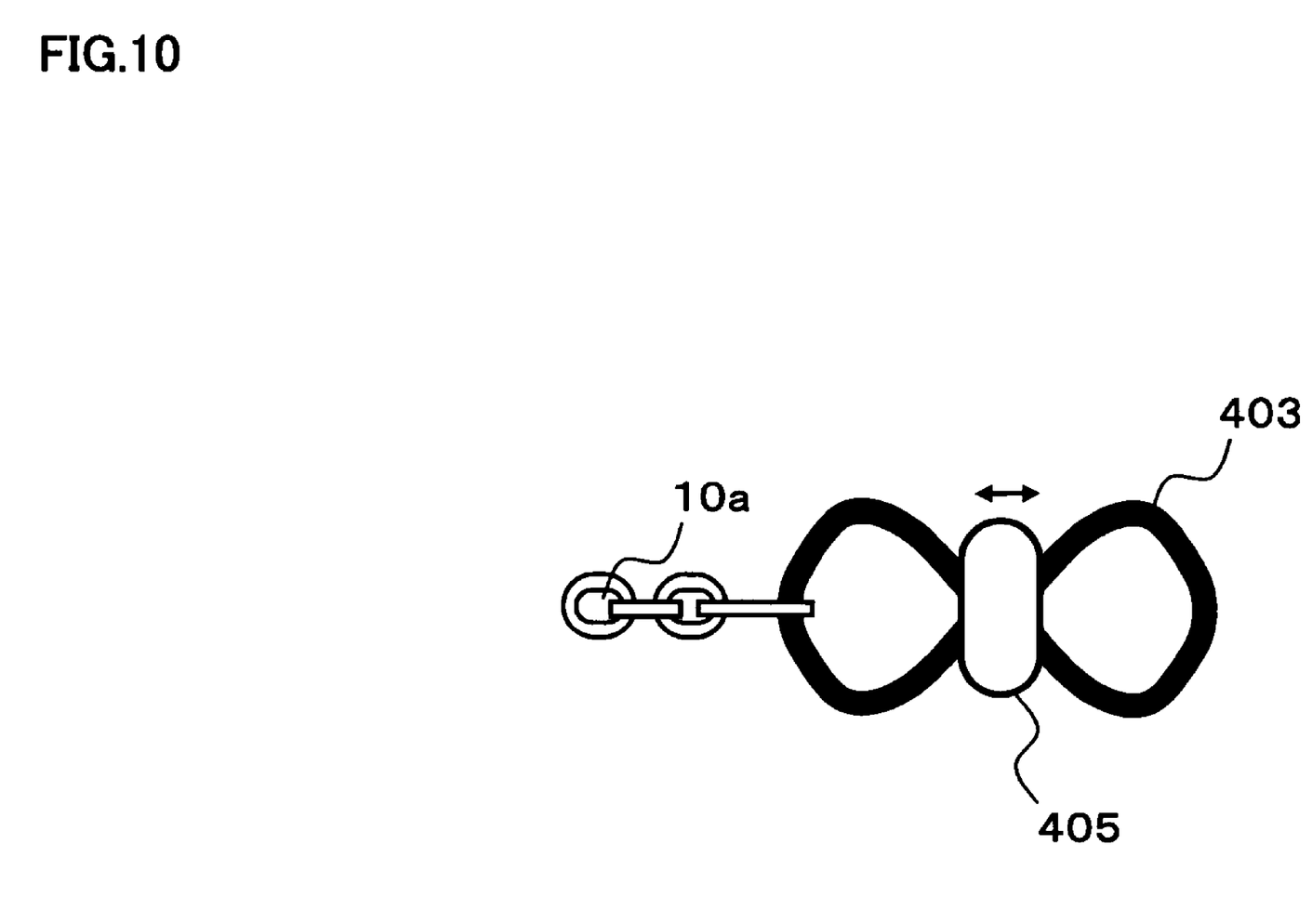
FIG. 10 is a figure to explain other mean to mount the chain part on an eyeglass frame.

In the embodiment mentioned above, it was illustrated the joining part 65 for an eyeglass frame illustrated in FIG. 1 as a mean to connect the chain part 10a to an eyeglass frame of the pair of eyeglasses 3. Besides this technology, the structure as shown in FIG. 10 is acceptable that a doughnut shaped adjustable part 405 is passed through a ring silicon 403. According to the technology in the FIG. 9, a user moves the position of an adjustable part 405 in the direction of the arrow in the FIG. 10 to set a size of the loop formed by the silicon part 403 and the adjustable part 405.

Moreover, the chain part 10a and an eyeglass frame of the pair of eyeglasses 3 may be connected by a way of fit of ruggedness.

Still, a shape of the base 20 may be other than a doughnut shape though the case in the embodiment mentioned above that a doughnut shaped base 20 was illustrated.

Also, in the embodiment mentioned above, the jewel 30 may be fixed rotatable on the base 20 as given in the Japanese published patent application mentioned above.

Besides, it was illustrated in the embodiment mentioned above that a permanent magnet was used as the base 20 and the rear surface magnet 40 mutually, however, either one may be a permanent magnet and another one a ferromagnetic force.

Further more, although it was illustrated in the embodiment mentioned above that the chain part 10a and 10b are individually installed, however, one chain part may materialize these.

In the above mentioned embodiment, it was illustrated a case that the invention was practiced by one module of a function of the base and a function of the magnet to be set on a rear surface. In this embodiment the invention is practiced by different modules of these functions.

Still more, a magnet to form a fixed distance relation may be installed at a fixed position except both ends of the chain part 10, while it is mounted on the eyeglasses. Then, this can keep high design character of the chain part 10a and 10b by being mounted on the eyeglasses.

Figure 11:
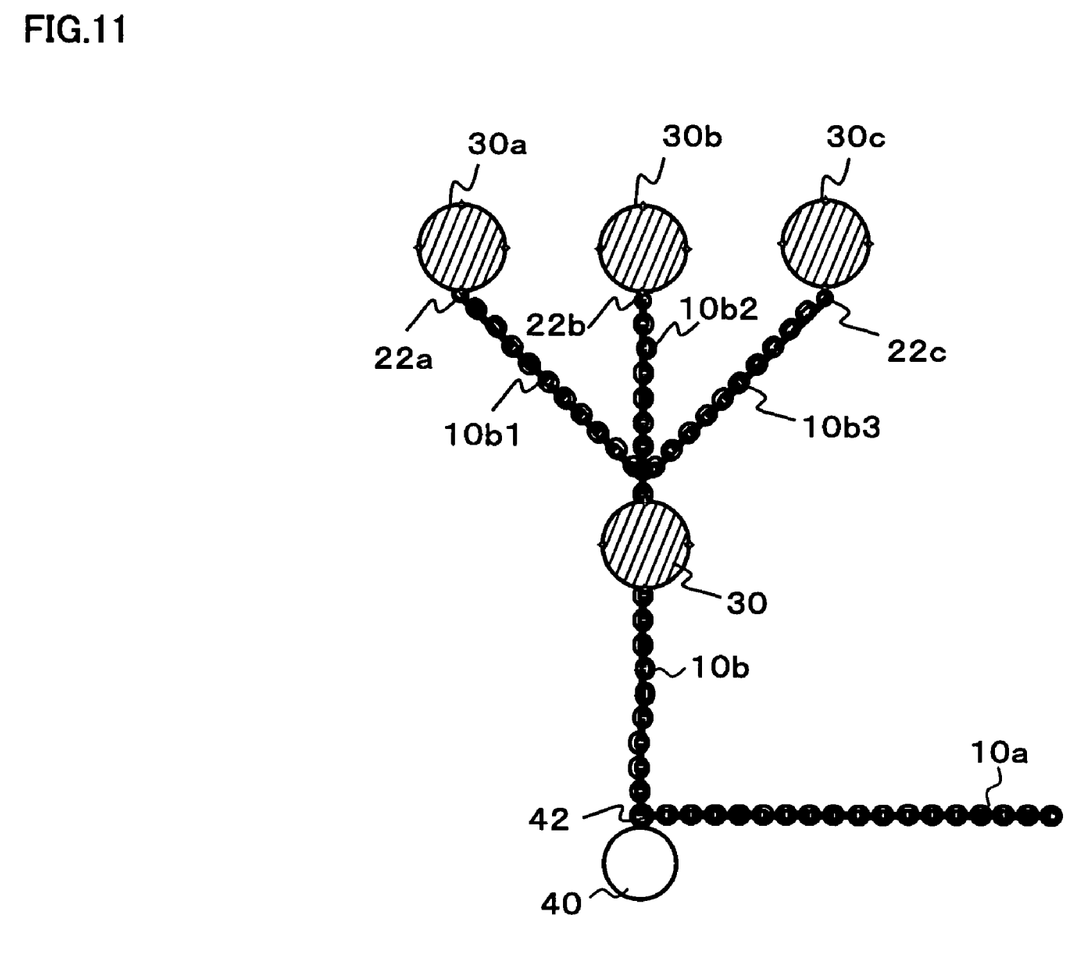
FIG. 11 illustrates an external figure of a front side of the jewelry article of other embodiment of the invention.

Further more, as illustrated in FIG. 11, a main body of a jewel 30 mounted on a base of a permanent magnet or a ferromagnetic force is jointed to an end part of the chain part 10b, and an end part of the chain part 10b1, 10b2 and 10b3 may be connected to the base.

A main body of a jewel 30a, 30b and 30c are fixed to another end part of the chain part 10b1, 10b2 and 10b3 by each base respectively.

The main body of a jewel 30 and the rear surface magnet 40 are held on a lens of eyeglasses attracting each other by a magnetic force. The number of chain parts installed in the base of a main body of a jewel 30 is arbitrary.

INDUSTRIAL USE POSSIBILITY

This invention is applicable for placing jewelry on a lens of eyeglasses.

What is claimed is:

1. A jewelry article for mounting on a lens of eyeglasses, comprising:
    a base held on a front surface of the lens;
    a main body of a jewel fixed on the base;
    a part held by a magnetic force generated between the base and the part at a position relative to the base on the front surface of the lens; and
    a detachable linear article joined to an eyeglass frame and connected to the base and the part.

2. The jewelry article as set forth in claim 1,
    wherein the base is held at an end part of the linear article and a joining-part for an eyeglass frame, which is joined on the eyeglass frame detachably is set at another end part of the linear article,
    and the part is held between the base and the joining-part for an eyeglass frame on the linear article.

3. The jewelry article as set forth in claim 2,
    wherein the linear article is a chain;
    the joining-part for an eyeglass frame comprises a ball-part for an eyeglass frame, which has a perforation hole to pass the chain though along the chain removable, and an end part of the chain is held at a holdback set on the ball-part for an eyeglass frame.

4. The jewelry article as set forth in claim 1,
    wherein the base is a doughnut shape and a part of the main body of the jewel is implanted in its midair.

5. The jewelry article as set forth in claim 1, further comprising a permanent magnet, which is attracting mutually by magnetic force, set on each of the base and the part.

6. The jewelry article as set forth in claim 1,
    wherein the main body of the jewel is mounted in the part.

7. The jewelry article as set forth in claim 1,
    wherein the base has a cylindrical shape including a rim and an orifice, and prong settings are installed along the rim of the base;
    a ring shaped permanent magnet formed inside of a bottom of the base;
    the main body of the jewel is shaped like an approximately triangular pyramid and includes a point positioned in a midair part on the permanent magnet; and
    a bottom surface of an outer circumference of the main body of the jewel is held by the prong settings in the base.

8. The jewelry article as set forth in claim 1,
    wherein the main body of the jewel is mounted in the joining-part for an eyeglass frame.

9. The jewelry article as set forth in claim 1,
    wherein a magnet to form a fixed distance relation at least for one side of the base and the part while installed on the eyeglasses at fixed positions other than both ends of the chain has been set.

10. The jewelry article as set forth in claim 1, wherein the length of the linear article is 5 to 30 cm.

11. A jewelry installation tool for eyeglasses to be used for mounting a main body of a jewel on a lens of eyeglasses, comprising:

the base to be positioned on a front surface of the lens and to fix the main body of the jewel;

the part held by a magnetic force generated between the base and the part at a position relative to the base on the front surface of the lens; and the linear article joined to an eyeglass frame detachably and connected to the base and the part.

* * * * *